(12) United States Patent
Rowell et al.

(10) Patent No.: US 7,769,123 B2
(45) Date of Patent: Aug. 3, 2010

(54) INSPECTION, MAINTENANCE, AND REPAIR APPARATUSES AND METHODS FOR NUCLEAR REACTORS

(75) Inventors: Jason Maxcy Rowell, Durham, NC (US); Kevin James Foley, Huntersville, NC (US)

(73) Assignee: GE-Hitachi Nuclear Energy Americas, LLC, Wilmington, NC (US)

( * ) Notice: Subject to any disclaimer, the term of this patent is extended or adjusted under 35 U.S.C. 154(b) by 212 days.

(21) Appl. No.: 11/812,576

(22) Filed: Jun. 20, 2007

(65) Prior Publication Data

US 2008/0317192 A1    Dec. 25, 2008

(51) Int. Cl.
 *G21C 17/00*    (2006.01)
(52) U.S. Cl. .................. 376/249; 376/248; 376/260
(58) Field of Classification Search ............... 376/249, 376/248, 260
 See application file for complete search history.

(56) References Cited

U.S. PATENT DOCUMENTS

| | | | |
|---|---|---|---|
| 4,025,053 A | 5/1977 | Stickle, Jr. | |
| 4,436,694 A * | 3/1984 | Vassalotti et al. | 376/310 |
| 4,686,078 A * | 8/1987 | Zwart, Jr. | 376/249 |
| 4,718,519 A | 1/1988 | Barker | |
| 5,176,362 A | 1/1993 | Seksaria et al. | |
| 5,364,071 A | 11/1994 | Lu | |
| 5,586,155 A | 12/1996 | Erbes et al. | |
| 5,652,387 A * | 7/1997 | Dumont et al. | 73/622 |
| 5,784,425 A | 7/1998 | Morlan | |
| 5,898,115 A * | 4/1999 | Davis et al. | 73/865.8 |
| 5,988,594 A | 11/1999 | Gill | |
| 6,375,161 B2 | 4/2002 | Garceau | |
| 6,536,283 B1 * | 3/2003 | Hatley | 73/622 |
| 6,916,058 B2 | 7/2005 | Krajenke | |
| 7,092,477 B2 * | 8/2006 | Wivagg et al. | 376/249 |
| 7,267,019 B2 * | 9/2007 | Morris et al. | 73/865.8 |
| 7,421,915 B2 * | 9/2008 | Yamane et al. | 73/865.8 |

\* cited by examiner

*Primary Examiner*—Rick Palabrica
(74) *Attorney, Agent, or Firm*—Harness, Dickey & Pierce, P.L.C.

(57) ABSTRACT

An apparatus for inspecting a nuclear reactor may include a track, arm, fixing device, and effector. The arm may be operatively connected to the track, the fixing device may be operatively connected to the track, and the effector may be operatively connected to the arm. The arm may have contracted and expanded lengths. The expanded length may be greater than two times the contracted length. The track may include one or more motors adapted to move the arm relative to the track. A method of inspecting, performing maintenance on, or repairing a reactor may include: operatively connecting a fixing device, track, arm, and effector to form an apparatus; inserting the apparatus into the reactor; fixing the apparatus within the reactor; and operating the apparatus. A method of operating a reactor may include shutting down; inspecting, performing maintenance on, or repairing the reactor; and starting up the reactor.

36 Claims, 13 Drawing Sheets

INSPECTION, MAINTENANCE, AND REPAIR APPARATUSES AND METHODS FOR NUCLEAR REACTORS

BACKGROUND

1. Field

Example embodiments relate to inspection, maintenance, and repair apparatuses and methods for nuclear reactors. Additionally, example embodiments relate to inspection, maintenance, and repair apparatuses and methods for nuclear reactors in confined areas, such as within the downcomer annulus between the reactor pressure vessel and the core shroud.

2. Description of Related Art

FIG. 1 is a sectional view, with parts cut away, of a typical reactor pressure vessel ("RPV") 100 in a related art nuclear boiling water reactor ("BWR"). During operation of the BWR, coolant water circulating inside RPV 100 is heated by nuclear fission produced in core 102. Feedwater is admitted into RPV 100 via feedwater inlet 104 and feedwater sparger 106 (a ring-shaped pipe that includes apertures for circumferentially distributing the feedwater inside RPV 100). The feedwater from feedwater sparger 106 flows downwardly through downcomer annulus 108 (an annular region between RPV 100 and core shroud 110).

Core shroud 110 is a stainless steel cylinder that surrounds core 102. Core 102 includes a multiplicity of fuel bundle assemblies 112 (two 2×2 arrays, for example, are shown in FIG. 1). Each array of fuel bundle assemblies 112 is supported at its top by top guide 114 and at its bottom by core plate 116. Top guide 114 provides lateral support for the top of fuel bundle assemblies 112 and maintains correct fuel-channel spacing to permit control rod insertion.

The coolant water flows downward through downcomer annulus 108 and into core lower plenum 118. The coolant water in core lower plenum 118 in turn flows upward through core 102. The coolant water enters fuel bundle assemblies 112, wherein a boiling boundary layer is established. A mixture of water and steam exits core 102 and enters core upper plenum 120 under shroud head 122. Core upper plenum 120 provides standoff between the steam-water mixture exiting core 102 and entering standpipes 124. Standpipes 124 are disposed atop shroud head 122 and in fluid communication with core upper plenum 120.

The steam-water mixture flows through standpipes 124 and enters steam separators 126 (which may be, for example, of the axial-flow, centrifugal type). Steam separators 126 substantially separate the steam-water mixture into liquid water and steam. The separated liquid water mixes with feedwater in mixing plenum 128. This mixture then returns to core 102 via downcomer annulus 108. The separated steam passes through steam dryers 130 and enters steam dome 132. The dried steam is withdrawn from RPV 100 via steam outlet 134 for use in turbines and other equipment (not shown).

The BWR also includes a coolant recirculation system that provides the forced convection flow through core 102 necessary to attain the required power density. A portion of the water is sucked from the lower end of downcomer annulus 108 via recirculation water outlet 136 and forced by a centrifugal recirculation pump (not shown) into a plurality of jet pump assemblies 138 (only one of which is shown) via recirculation water inlets 140. The jet pump assemblies 138 are circumferentially distributed around the core shroud 110 and provide the required reactor core flow. A typical BWR includes 16 to 24 inlet mixers.

As shown in FIG. 1, related art jet pump assemblies 138 typically include a pair of inlet mixers 142. Each inlet mixer 142 has an elbow 144 welded thereto which receives pressurized driving water from a recirculation pump (not shown) via inlet riser 146. An exemplary inlet mixer 142 includes a set of five nozzles circumferentially distributed at equal angles about the inlet mixer axis. Each nozzle is tapered radially inwardly at its outlet. The jet pump is energized by these convergent nozzles. Five secondary inlet openings are radially outside of the nozzle exits. Therefore, as jets of water exit the nozzles, water from downcomer annulus 108 is drawn into inlet mixer 142 via the secondary inlet openings, where it is mixed with coolant water from the recirculation pump. The coolant water then flows into diffuser 148.

Core shroud 110 may include, for example, a shroud head flange (not shown) for supporting shroud head 122, an upper shroud wall (not shown) having a top end welded to the shroud head flange, a top guide support ring (not shown) welded to the bottom end of the upper shroud wall, a middle shroud wall (not shown) having a top end welded to the top guide support ring and including two or three vertically stacked shell sections (not shown) joined by mid-shroud attachment weld(s), and an annular core plate support ring (not shown) welded to the bottom end of the middle shroud wall and to the top end of a lower shroud wall (not shown). The entire shroud is supported by a shroud support (not shown), which is welded to the bottom of the lower shroud wall, and by an annular jet pump support plate (not shown), which is welded at its inner diameter to the shroud support and at its outer diameter to RPV 100.

Typically, the material of core shroud 110 and associated welds is austenitic stainless steel having reduced carbon content. The heat-affected zones of the shroud girth welds, including the mid-shroud attachment weld(s), have residual weld stresses. Therefore, mechanisms are present for mid-shroud attachment weld(s) and other girth welds to be susceptible to intergranular stress corrosion cracking (IGSCC).

IGSCC in the heat affected zone of any shroud girth seam weld diminishes the structural integrity of core shroud 110, which vertically and horizontally supports top guide 114 and shroud head 122. In particular, a cracked core shroud 110 increases the risks posed by a loss-of-coolant accident (LOCA) or seismic loads. During a LOCA, the loss of coolant from RPV 100 produces a loss of pressure above shroud head 122 and an increase in pressure inside core shroud 110, i.e., underneath shroud head 122. The result is an increased lifting force on shroud head 122 and on the upper portions of core shroud 110 to which shroud head 122 is bolted. If core shroud 110 has fully cracked girth welds, the lifting forces produced during a LOCA could cause core shroud 110 to separate along the areas of cracking, producing undesirable leaking of reactor coolant. Also, if the weld zones of core shroud 110 fail due to IGSCC, there is a risk of misalignment from seismic loads and damage to core 102 and the control rod components, which would adversely affect control rod insertion and safe shutdown.

Thus, core shroud 110 needs to be examined periodically to determine its structural integrity and the need for repair. Ultrasonic inspection is a known technique for detecting cracks in nuclear reactor components. The inspection area of primary interest is the outside surface of core shroud 110 at the horizontal and/or vertical mid-shroud attachment weld(s). However, core shroud 110 is difficult to access. Installation access is limited to the annular space between the outside of core shroud 110 and the inside of RPV 100, between adjacent jet pump assemblies 138. Scanning operation access is additionally restricted within the narrow space between core shroud 110 and jet pump assemblies 138, which is about 0.5 inch wide in some locations. The inspection areas are highly radioactive and may be located under water, 50 feet or more below an operator's work platform. As a result, inspection of core shroud 110 and/or RPV 100, as well as all other inspection, maintenance, and repair within downcomer annulus 108 often is difficult and complicated.

Solutions to the problem of inspecting core shroud 110 have been proposed, as discussed, for example, in U.S. Pat. No. 5,586,155 ("the '155 patent"). The disclosure of the '155 patent is incorporated in this application by reference. However, these proposed solutions do not include inspection, maintenance, and repair apparatuses and methods for nuclear reactors similar to the present invention.

SUMMARY

Example embodiments relate to inspection, maintenance, and repair apparatuses and methods for nuclear reactors. Additionally, example embodiments relate to inspection, maintenance, and repair apparatuses and methods for nuclear reactors in confined areas, such as within the downcomer annulus between the reactor pressure vessel and the core shroud.

In an example embodiment, a method of inspecting a nuclear reactor may include: operatively connecting a fixing device, a first track, an arm, and an effector to form an inspection apparatus; inserting the inspection apparatus into the reactor; fixing the inspection apparatus within the reactor; and/or operating the inspection apparatus. The arm may have a contracted length. The arm may have an expanded length. The expanded length may be greater than two times the contracted length.

In another example embodiment, a method of performing maintenance on a nuclear reactor may include: operatively connecting a fixing device, a first track, an arm, and one or more tools to form a maintenance apparatus; inserting the maintenance apparatus into the reactor; fixing the maintenance apparatus within the reactor; and/or operating the maintenance apparatus. The arm may have a contracted length. The arm may have an expanded length. The expanded length may be greater than two times the contracted length.

In yet another example embodiment, a method of repairing a nuclear reactor may include: operatively connecting a fixing device, a first track, an arm, and one or more sensors, one or more tools, or one or more sensors and one or more tools to form a repair apparatus; inserting the repair apparatus into the reactor; fixing the repair apparatus within the reactor; and/or operating the repair apparatus. The arm may have a contracted length. The arm may have an expanded length. The expanded length may be greater than two times the contracted length.

In still another example embodiment, an apparatus for inspecting a nuclear reactor may include: a first track; an arm; a fixing device; and/or an effector. The arm may be operatively connected to the first track. The fixing device may be operatively connected to the first track. The effector may be operatively connected to the arm. The arm may have a contracted length. The arm may have an expanded length. The expanded length may be greater than two times the contracted length.

In a further example embodiment, an apparatus for inspecting a nuclear reactor may include: a first track; an arm; a fixing device; and/or an effector. The arm may be operatively connected to the first track. The fixing device may be operatively connected to the first track. The effector may be operatively connected to the arm. The first track may include one or more motors adapted to move the arm relative to the first track.

In another further example embodiment, an apparatus for performing maintenance on a nuclear reactor may include: a first track; an arm; a fixing device; and/or one or more tools. The arm may be operatively connected to the first track. The fixing device may be operatively connected to the first track. The one or more tools may be operatively connected to the arm. The arm may have a contracted length. The arm may have an expanded length. The expanded length may be greater than two times the contracted length.

In yet another further example embodiment, an apparatus for performing maintenance on a nuclear reactor, the apparatus comprising: a first track; an arm; a fixing device; and/or one or more tools. The arm may be operatively connected to the first track. The fixing device may be operatively connected to the first track. The one or more tools may be operatively connected to the arm. The first track may include one or more motors adapted to move the arm relative to the first track.

In still another further example embodiment, an apparatus for repairing a nuclear reactor may include: a first track; an arm; a fixing device; one or more sensors; and/or one or more tools. The arm may be operatively connected to the first track. The fixing device may be operatively connected to the first track. The one or more sensors, the one or more tools, or the one or more sensors and the one or more tools may be operatively connected to the arm. The arm may have a contracted length. The arm may have an expanded length. The expanded length may be greater than two times the contracted length.

In an additional example embodiment, an apparatus for repairing a nuclear reactor may include: a first track; an arm; a fixing device; one or more sensors; and/or one or more tools. The arm may be operatively connected to the first track. The fixing device may be operatively connected to the first track. The one or more sensors, the one or more tools, or the one or more sensors and the one or more tools may be operatively connected to the arm. The first track may include one or more motors adapted to move the arm relative to the first track.

In another additional example embodiment, a kit for inspecting, performing maintenance on, or repairing a nuclear reactor may include: a first track; an arm; and/or a fixing device. The arm may be adapted to be operatively connected to the first track. The fixing device may be adapted to be operatively connected to the first track. The arm may have a contracted length. The arm may have an expanded length. The expanded length may be greater than two times the contracted length.

In yet another additional example embodiment, a kit for inspecting, performing maintenance on, or repairing a nuclear reactor may include: a first track; an arm; and/or a fixing device. The arm may be adapted to be operatively connected to the first track. The fixing device may be adapted to be operatively connected to the first track. The first track may include one or more motors adapted to move the arm relative to the first track.

BRIEF DESCRIPTION OF THE DRAWINGS

The above and/or other aspects and advantages will become more apparent and more readily appreciated from the following detailed description of example embodiments taken in conjunction with the accompanying drawings, in which.

DETAILED DESCRIPTION OF EXAMPLE EMBODIMENTS

Figure 1:
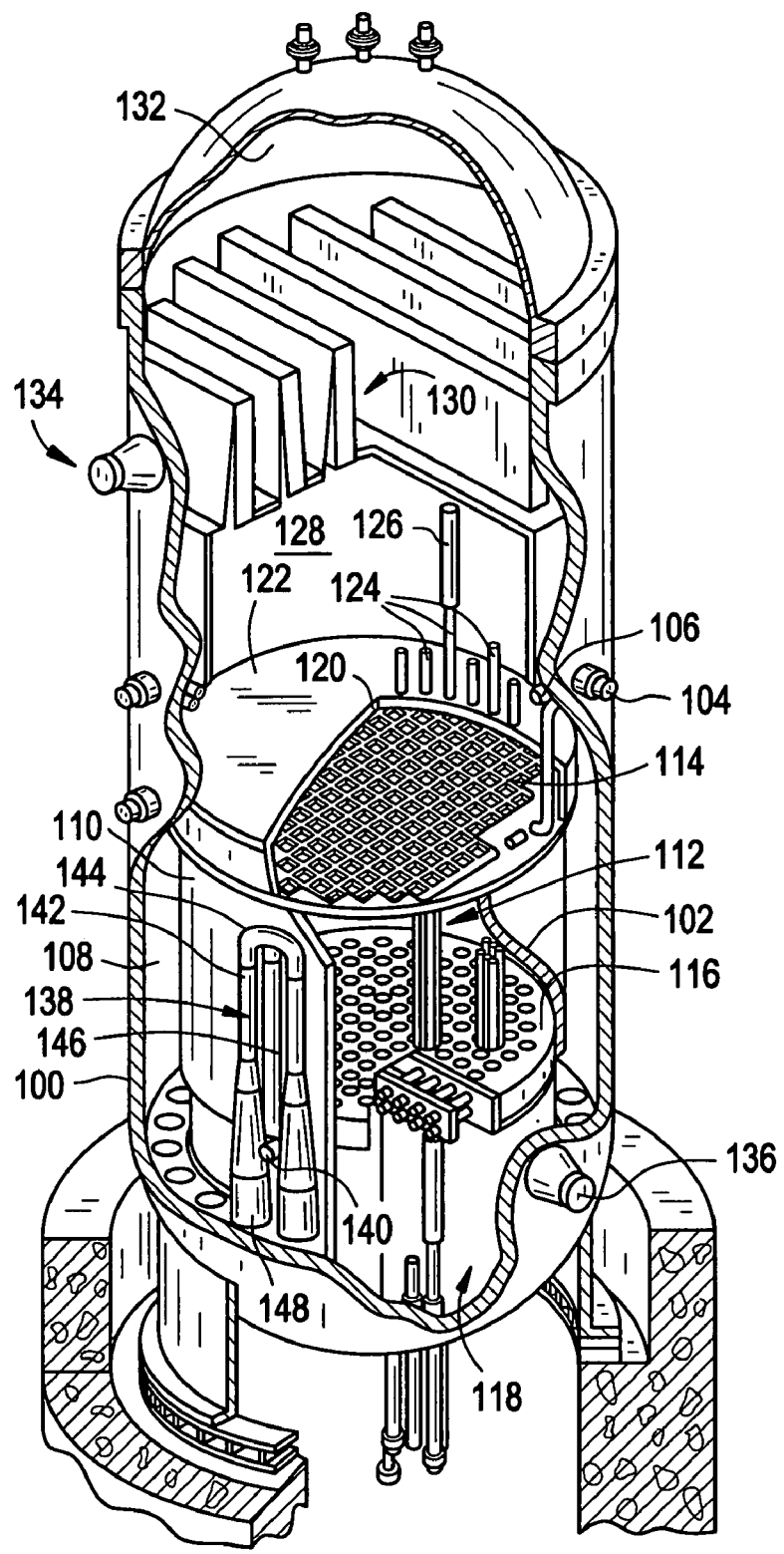
FIG. 1 is a sectional view, with parts cut away, of a typical RPV in a related art BWR.

Example embodiments will now be described more fully with reference to the accompanying drawings. Embodiments, however, may be embodied in many different forms and should not be construed as being limited to the example embodiments set forth herein. Rather, these example embodiments are provided so that this disclosure will be thorough and complete, and will fully convey the scope to those skilled in the art.

It will be understood that when a component is referred to as being "on," "connected to," "coupled to," or "fixed to" another component, it may be directly on, connected to, coupled to, or fixed to the other component or intervening components may be present. In contrast, when a component is referred to as being "directly on," "directly connected to," "directly coupled to," or "directly fixed to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the example embodiments.

Spatially relative terms, such as "beneath," "below," "lower," "above," "upper," and the like may be used herein for ease of description to describe one component and/or feature relative to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, and/or components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals refer to the like components throughout.

Figure 2:
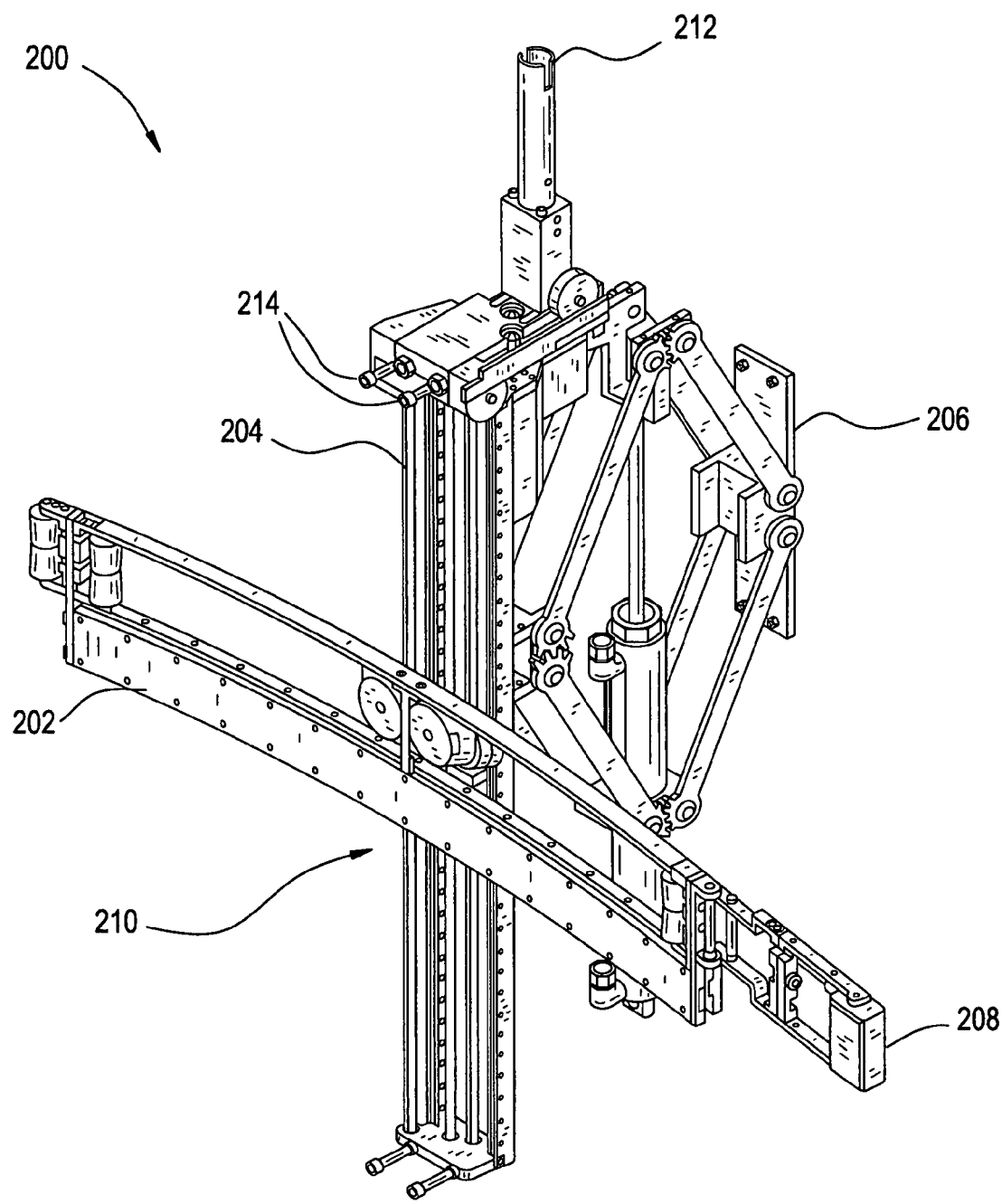
FIG. 2 is a perspective view of an inspection, maintenance, and repair apparatus for nuclear reactors, according to an example embodiment.

FIG. 2 is a perspective view of an inspection, maintenance, and repair apparatus for nuclear reactors, according to an example embodiment. As shown in FIG. 2, apparatus 200 for inspection, maintenance, and/or repair of nuclear reactors may include: arm 202, first track 204, fixing device 206, and/or effector 208. Arm 202 may be operatively connected to first track 204. Fixing device 206 may be operatively connected to first track 204. Effector 208 may be operatively connected to arm 202.

Apparatus 200 may allow a reduced number of movements for full or limited coverage of inspection, maintenance, and/or repair. At least partially as a result, apparatus 200 may shorten inspection cycles and/or simplify inspection plans.

Arm 202 may have a contracted length and an expanded length. The expanded length may be greater than two times the contracted length. For example, the expanded length may be about 2.5, 3, 3.5, 4, 4.5, 5, 5.5, 6, 6.5, 7, 7.5, 8, or more times the contracted length. In addition or in the alternative, first track 204 may include one or more motors adapted to move arm 202 relative to first track 204.

Arm 202 may be adapted to move relative to first track 204. For example, arm 202 may be adapted to move along first track 204, to move relative to operative connection 210 of arm 202 to first track 204, and/or to rotate relative to first track 204.

Effector 208 may include one or more sensors. For example, the one or more sensors may include at least one camera, at least one video camera, at least one transducer, at least one ultrasonic transducer, and/or at least one scanner. At least one of the one or more sensors may be, for example, sensitive to touch and/or pressure, moisture, temperature, pH, conductivity, and/or the presence and/or concentration of chemicals.

In addition or in the alternative, effector 208 may include one or more tools, such as tools for cleaning the reactor, finding and/or retrieving reactor components, welding, and/or electrical discharge machining ("EDM").

In an example embodiment, apparatus 200 may be inserted into the reactor on the end of a long pole (not shown) connected to adapter assembly 212. The pole may be about 60 feet to about 80 feet in length, at least in part due to one or more of the distance from a workers' platform above the reactor to the reactor itself, the radiation exposure in the area of the workers' platform and the reactor, and the fact that the reactor may be substantially full of water when apparatus 200 is inserted into the reactor. One or more workers may control the pole to position the apparatus 200 as required in the reactor. That position might be, for example, between the outside of core shroud 110 and the inside of RPV 100, with first track 204, effector 208, and/or one or more of adjustable feet 214 substantially in contact with core shroud 110 and/or fixing device 206 substantially in contact with RPV 100. Apparatus 200 also may be inserted into the reactor using a remotely operated vehicle ("ROV") (not shown), a cable/chain hoist (not shown), or similar device(s).

When inserting apparatus 200 into the reactor, arm 202 may be rotated to be substantially parallel to first track 204. This parallelism may assist the one or more workers in expeditiously positioning apparatus 200 in the reactor.

In an example embodiment, once apparatus 200 is properly positioned, the one or more workers may cause fixing device 206 to exert pressure on RPV 100 to force first track 204, effector 208, and/or one or more of adjustable feet 214 to contact core shroud 110, fixing apparatus 200 in position. Apparatus 200 also may be fixed in position by fixing device 206 in the form of a mast, scan arm, or equivalent that may be, for example, connected to core shroud 110 and/or the shroud head flange (not shown), or may ride on the steam dam (not shown) of the reactor.

With apparatus 200 fixed in position, effector 208 may be positioned as required using arm 202 and first track 204. For example, assuming that first track 204 is fixed in a vertical orientation, arm 202 may be moved along first track 204 to raise or lower operative connection 210 (and, thus, to raise or lower effector 208), arm 202 may be moved relative to operative connection 210 (and, thus, to change the distance of effector 208 from operative connection 210), and/or arm 202 may be rotated relative to first track 204 to change the angle of arm 202 relative to first track 204 (and, thus, to change the angular position of effector 208). The narrow profile of arm 202 and effector 208 may allow effector 208 access to confined spaces inaccessible by other devices, such as ROVs.

Effector 208 may be positioned by any of these "degrees of freedom" independently or by two or more simultaneously. Additionally or in the alternative, effector 208 may have "degrees of freedom" other than those discussed above. Some examples are in included in the discussion of arm 202 below.

Apparatus 200 may further include a cable management system. The cable management system helps to manage one or more umbilical cables (not shown) that, for example, may supply power (i.e., electrical, pneumatic, and/or hydraulic (water-based)) to apparatus 200, may provide control signals to apparatus 200, and/or may provide the one or more workers with sensors signals from apparatus 200. The one or more umbilical cables may reach from a workers' platform to apparatus 200 and/or effector 208.

First track 204 may include at least a portion of the cable management system. Similarly, arm 202 may include at least a portion of the cable management system. In an example embodiment, first track 204 may include a first portion of the cable management system and arm 202 may include a second portion of the cable management system.

Figure 3:
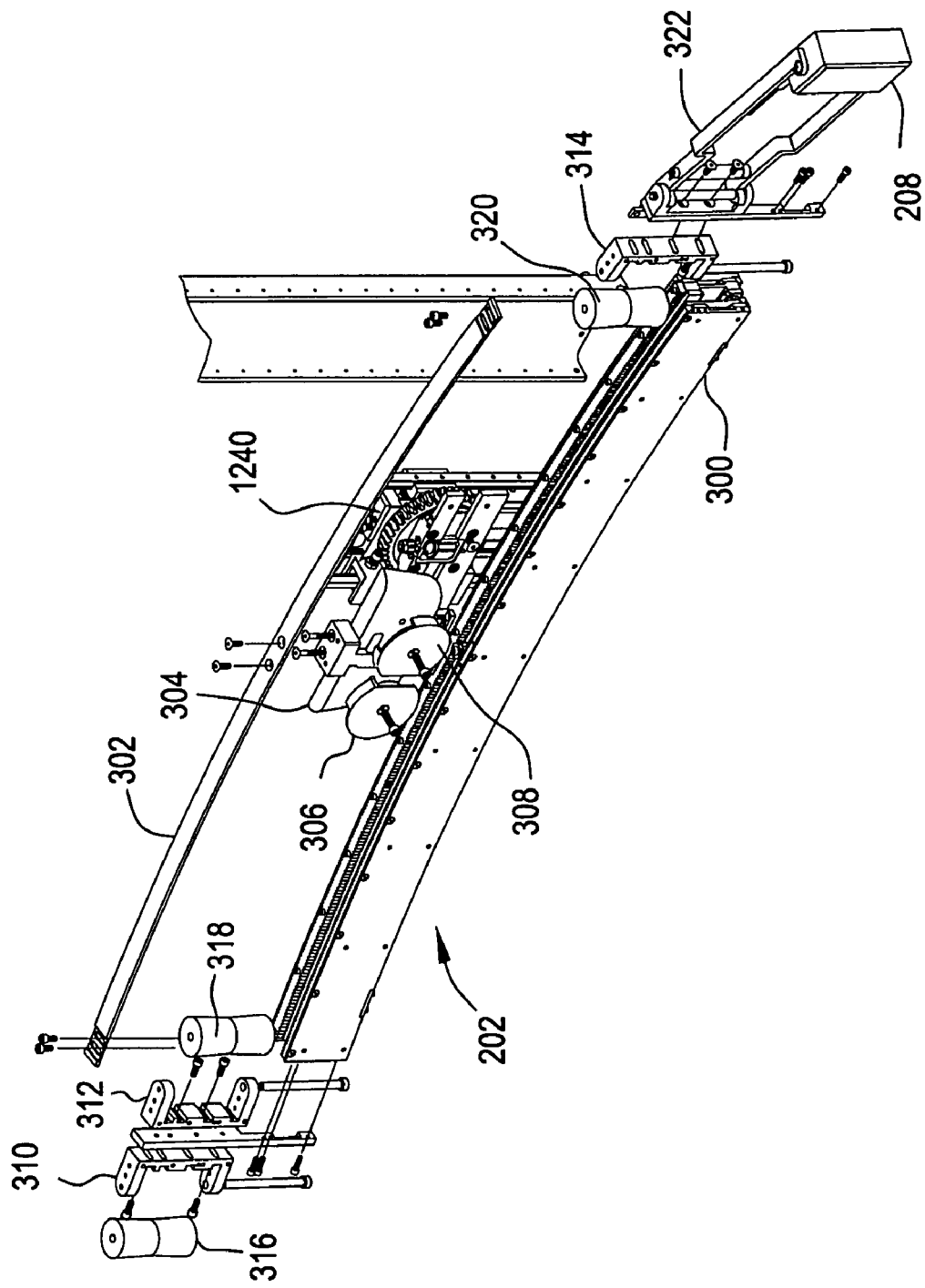
FIG. 3 is an exploded, perspective view of an arm of the apparatus of FIG. 2.
Figure 4:
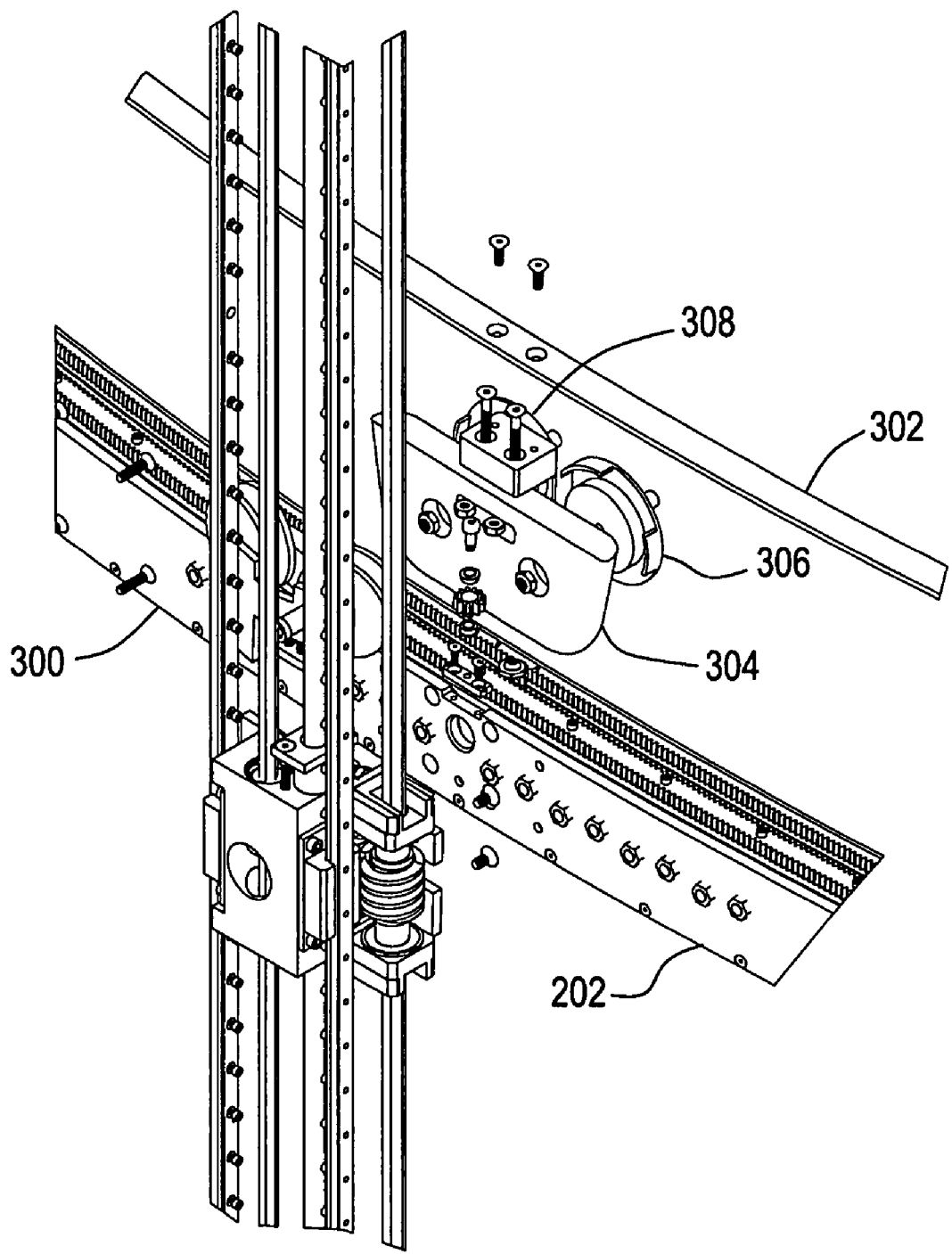
FIG. 4 is a reverse exploded, perspective view of the arm of FIG. 3.

FIG. 3 is an exploded, perspective view of an arm of the apparatus of FIG. 2, while FIG. 4 is a reverse exploded, perspective view of the arm of FIG. 3. As shown in FIGS. 3 and 4, arm 202 may include second track 300; crossbar 302; guide block 304; guides 306 and/or 308; roller brackets 310, 312, and/or 314; rollers 316, 318, and/or 320; and/or effector bracket 322.

Second track 300 may include three or more sections. Typically, because the sections are stacked, more sections results in a thicker second track 300.

Sections of second track 300 may be manufactured with a standardized radius of curvature or standardized radii of curvature. However, the radius of curvature of second track 300 does not need to exactly match that of core shroud 110, RPV 100, etc. This may be true, for example, if effector 208 does not have to be in direct contact with core shroud 110, RPV 100, etc. In addition or in the alternative, this may be true because effector 208 may be operatively connected to arm 202 using effector bracket 322, and effector bracket 322 may be spring-loaded or equivalent to influence effector 208 toward core shroud 110, RPV 100, etc.

In an example embodiment, crossbar 302 may function primarily as a structural support.

In addition to the degrees of freedom discussed above, effector 208 may have additional degrees of freedom. For example, effector 208 may be operatively connected to arm 202 using a gimbal or some other device. In an example embodiment, effector 208 may be operatively connected to arm 202 anywhere on arm 202.

As discussed above, arm 202 may include at least a portion of the cable management system. That portion may include, for example, one or more of guide block 304; guides 306 and/or 308; roller brackets 310, 312, and/or 314; and rollers 316, 318, and/or 320.

Figure 5:
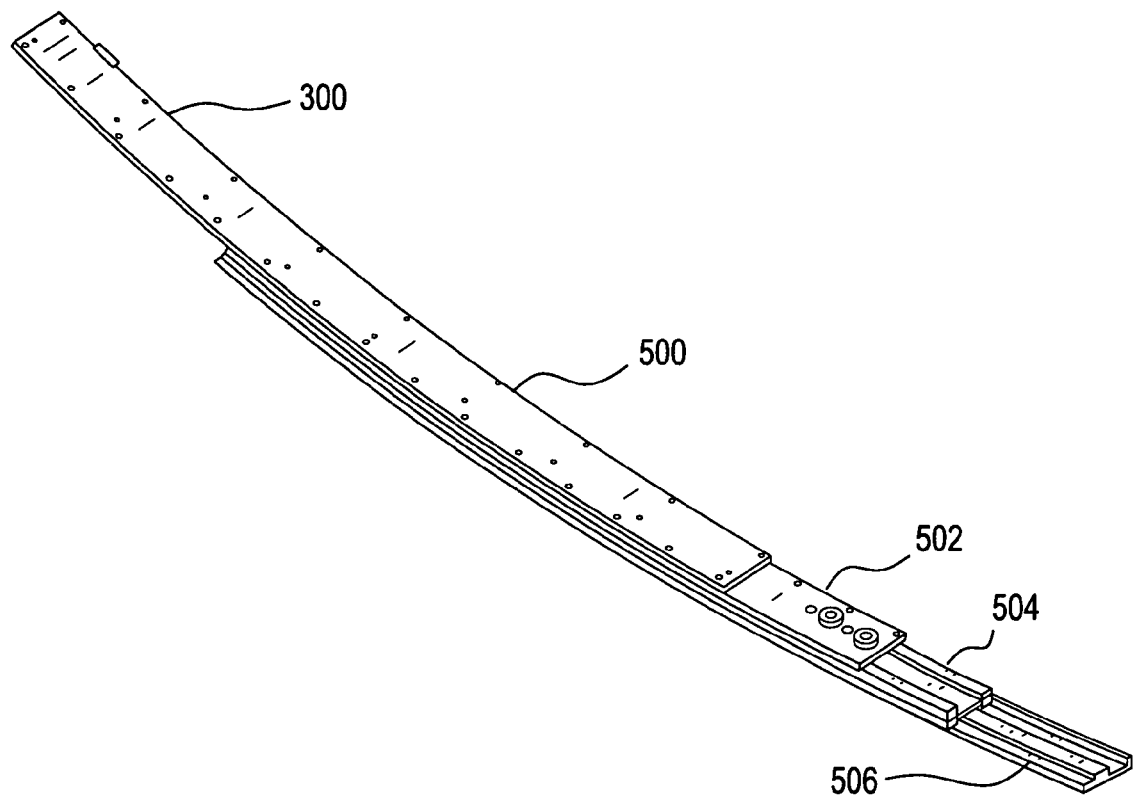
FIG. 5 is a front perspective view of a second track of the arm of FIG. 3.
Figure 6:
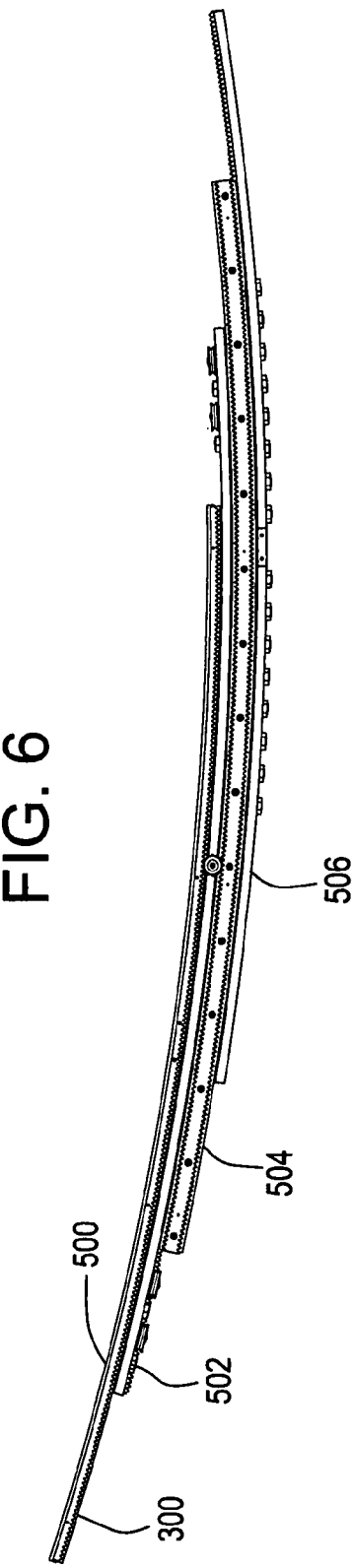
FIG. 6 is a top view of the second track of FIG. 5.
Figure 7:
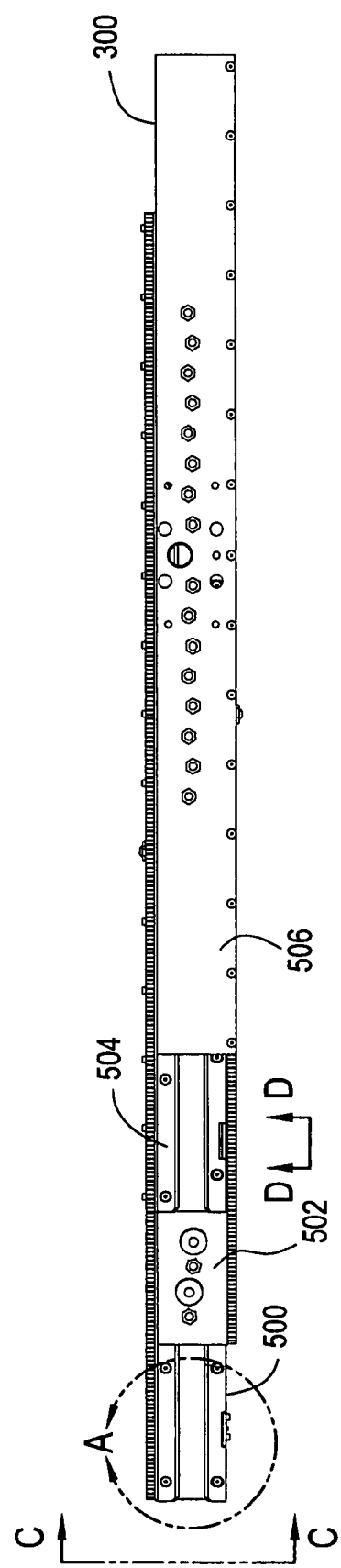
FIG. 7 is a rear view of the second track of FIG. 6.
Figure 8:
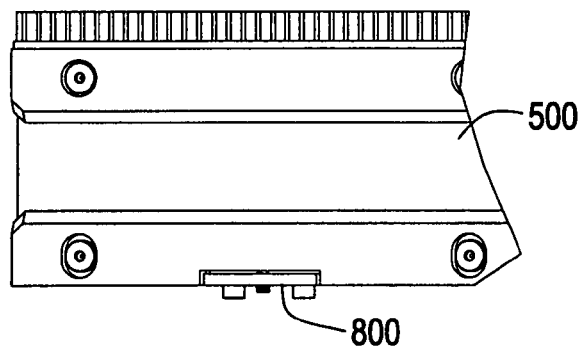
FIG. 8 is a first detailed view of the second track of FIG. 7.
Figure 9:
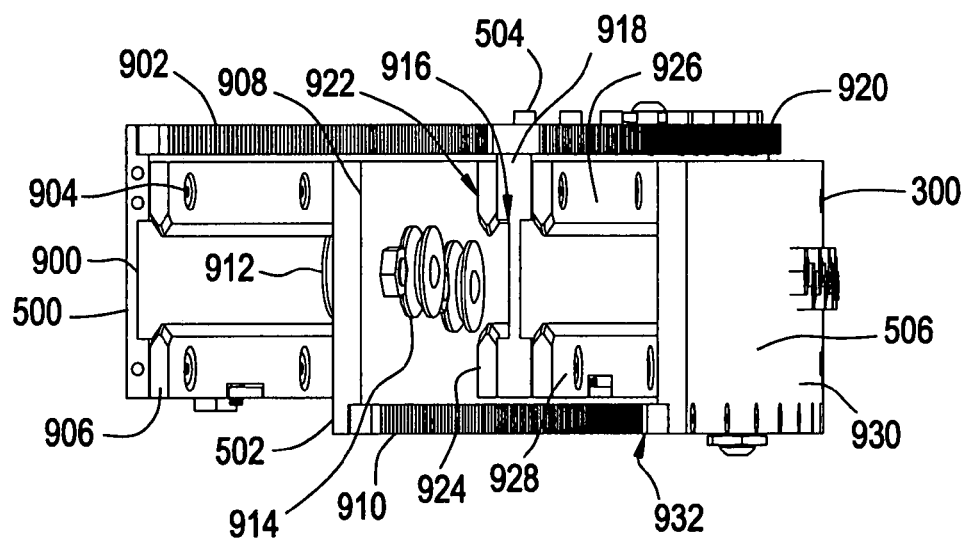
FIG. 9 is a second detailed view of the second track of FIG. 7.
Figure 10:
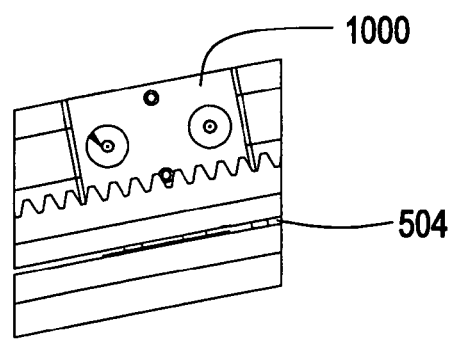
FIG. 10 is a third detailed view of the second track of FIG. 7.

FIG. 5 is a front perspective view of second track 300 of arm 202 of FIG. 3, FIG. 6 is a top view of second track 300 of FIG. 5, and FIG. 7 is a rear view of second track 300 of FIG. 6. FIG. 8 is a first detailed view of second track 300 of FIG. 7, FIG. 9 is a second detailed view of second track 300 of FIG. 7, and FIG. 10 is a third detailed view of second track 300 of FIG. 7. As shown in FIGS. 5-9, second track 300 may include first section 500, second section 502, third section 504, and/or fourth section 506. Fourth section 506 may be fixed to first track 204.

First section 500 may include backbone 900, upper gear rack 902, upper rail 904, and/or lower rail 906. Second section 502 may include backbone 908, lower gear rack 910, one or more inner rollers 912, and/or one or more outer rollers 914. Third section 504 may include backbone 916, inner upper gear rack 918, outer upper gear rack 920, inner upper rail 922, inner lower rail 924, outer upper rail 926, and/or outer lower rail 928. Fourth section 506 may include backbone 930, lower gear rack 932, and/or one or more rollers (not shown).

In FIG. 9, upper rail 904 and lower rail 906 of first section 500 are depicted as v-shaped rails. Although other shapes are possible, one or more inner rollers 912 of second section 502 ride on one or both of upper rail 904 and lower rail 906. Similarly, inner upper rail 922 and inner lower rail 924 of third section 504 are depicted as v-shaped rails. Although other shapes are possible, one or more outer rollers 914 of second section 502 ride on one or both of inner upper rail 922 and inner lower rail 924. In the same way, outer upper rail 926 and outer lower rail 928 of third section 504 are depicted as v-shaped rails. Although other shapes are possible, one or more rollers (not shown) of fourth section 506 ride on one or both of outer upper rail 926 and outer lower rail 928.

Upper gear rack 902 and inner upper gear rack 918 may be connected by a first idler gear (not shown) so that when second track 300 is expanded or contracted by the driving of outer upper gear rack 920, first section 500 is driven by third section 504. Similarly, lower gear rack 910 and lower gear rack 932 may be connected by a second idler gear (not shown) so that when second track 300 is expanded or contracted by the driving of outer upper gear rack 920, second section 502 is driven by fourth section 506. In this way, when second track 300 is expanded or contracted by the driving of outer upper gear rack 920, first section 500, second section 502, and third section 504 may all move simultaneously relative to fourth section 506. In a first example embodiment, the extent of this simultaneous movement is proportional between sections. In a second example embodiment, the extent of the simultaneous movement is identical between sections.

FIG. 8 shows rail adjuster 800 attached to first section 500. FIG. 10 shows rail adjuster 1000 attached to third section 504. Such rail adjusters allow mechanical adjustments to the tension between an upper and lower rail pair (i.e., between upper rail 904 and lower rail 906 of first section 500).

In another example embodiment, apparatus 200 for inspection, maintenance, and/or repair of nuclear reactors may include: arm 202, first track 204, fixing device 206, and/or effector 208. Arm 202 may include a second track with a curvature opposite to that of second track 300. In this case, the apparatus 200 may be positioned, for example, between the outside of core shroud 110 and the inside of RPV 100, with first track 204, effector 208, and/or one or more of adjustable feet 214 substantially in contact with RPV 100 and/or fixing device 206 substantially in contact with core shroud 110. The apparatus 200 may be used, for example, to inspect the inner surface of RPV 100.

In a further example embodiment, apparatus 200 for inspection, maintenance, and/or repair of nuclear reactors may include: arm 202, first track 204, fixing device 206, and/or effector 208. Arm 202 may include a second track that is substantially straight. In this case, the apparatus 200 may be used, for example, to inspect any substantially flat surface in the reactor.

In yet another example embodiment, apparatus 200 for inspection, maintenance, and/or repair of nuclear reactors may include: arm 202, first track 204, fixing device 206, and/or effector 208. Arm 202 may include one or more second tracks. At least one of the one or more second tracks may be a curved track. In addition or in the alternative, at least one of the one or more second tracks may be a substantially straight track. In addition or in the alternative, at least one of the one or more second tracks may include at least three sections. In an example embodiment, the at least three sections may be are adapted to contract arm 202 to the contracted length and/or to expand arm 202 to the expanded length.

Figure 11:
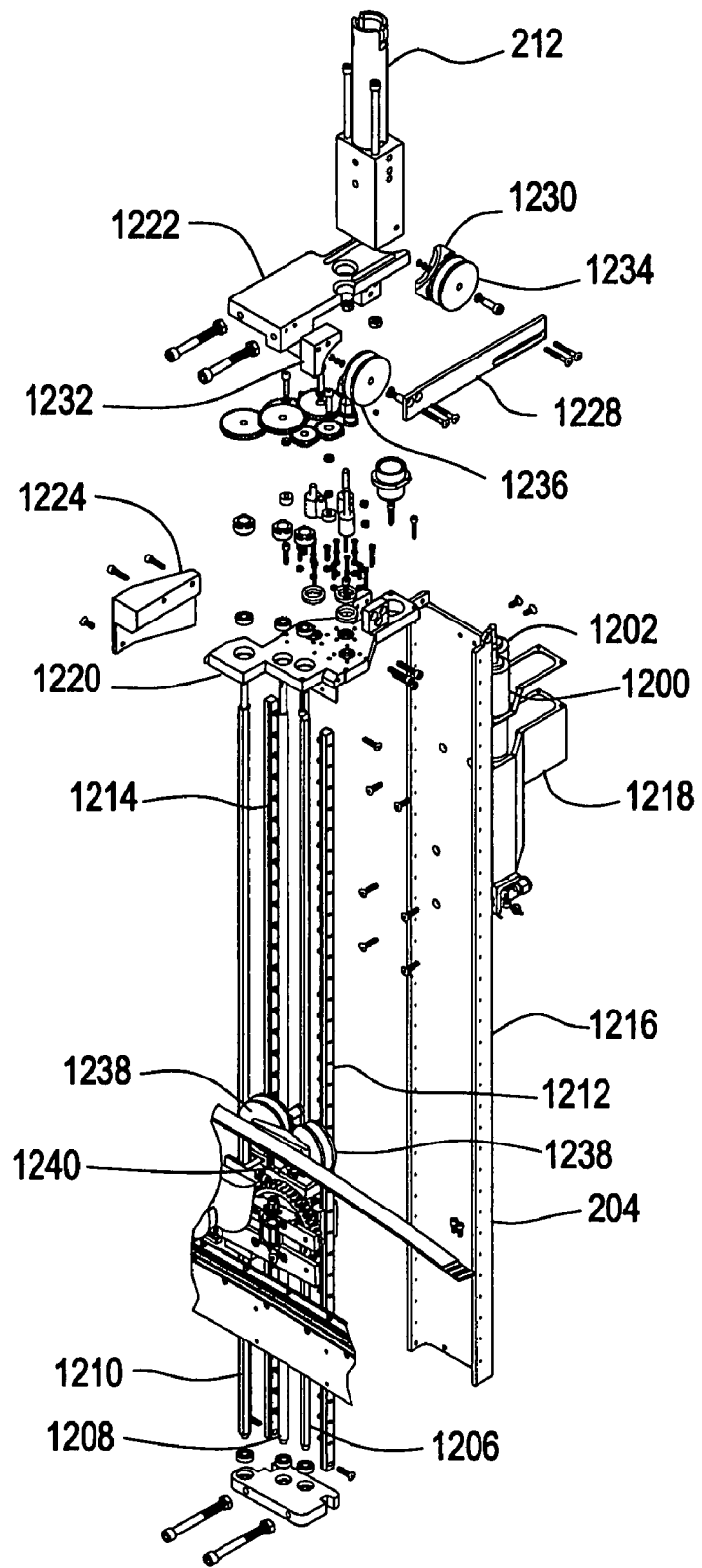
FIG. 11 is an exploded, perspective view of a first track of the apparatus of FIG. 2.
Figure 12:
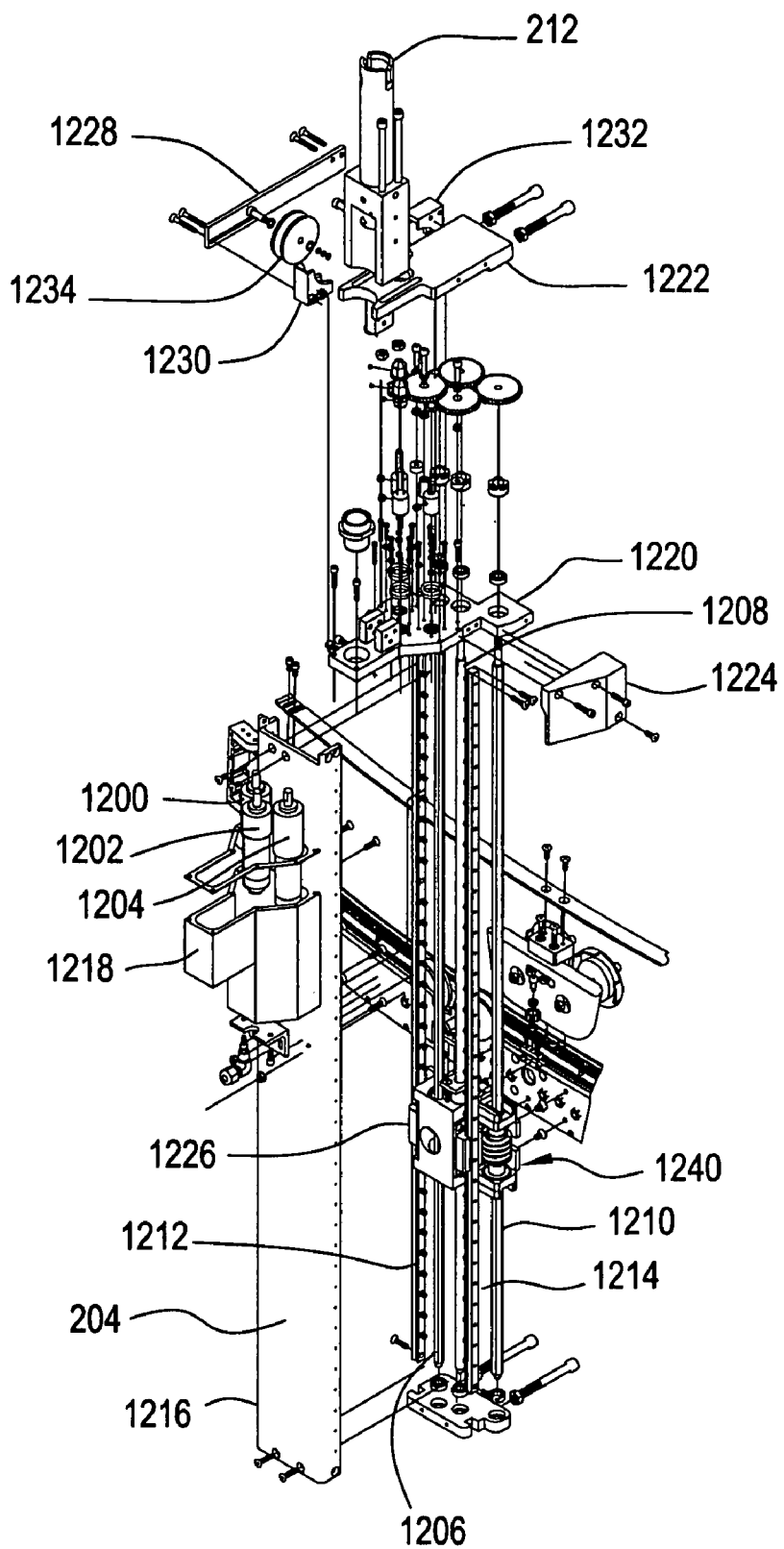
FIG. 12 is a reverse exploded, perspective view of the first track of FIG. 11.
Figure 13:
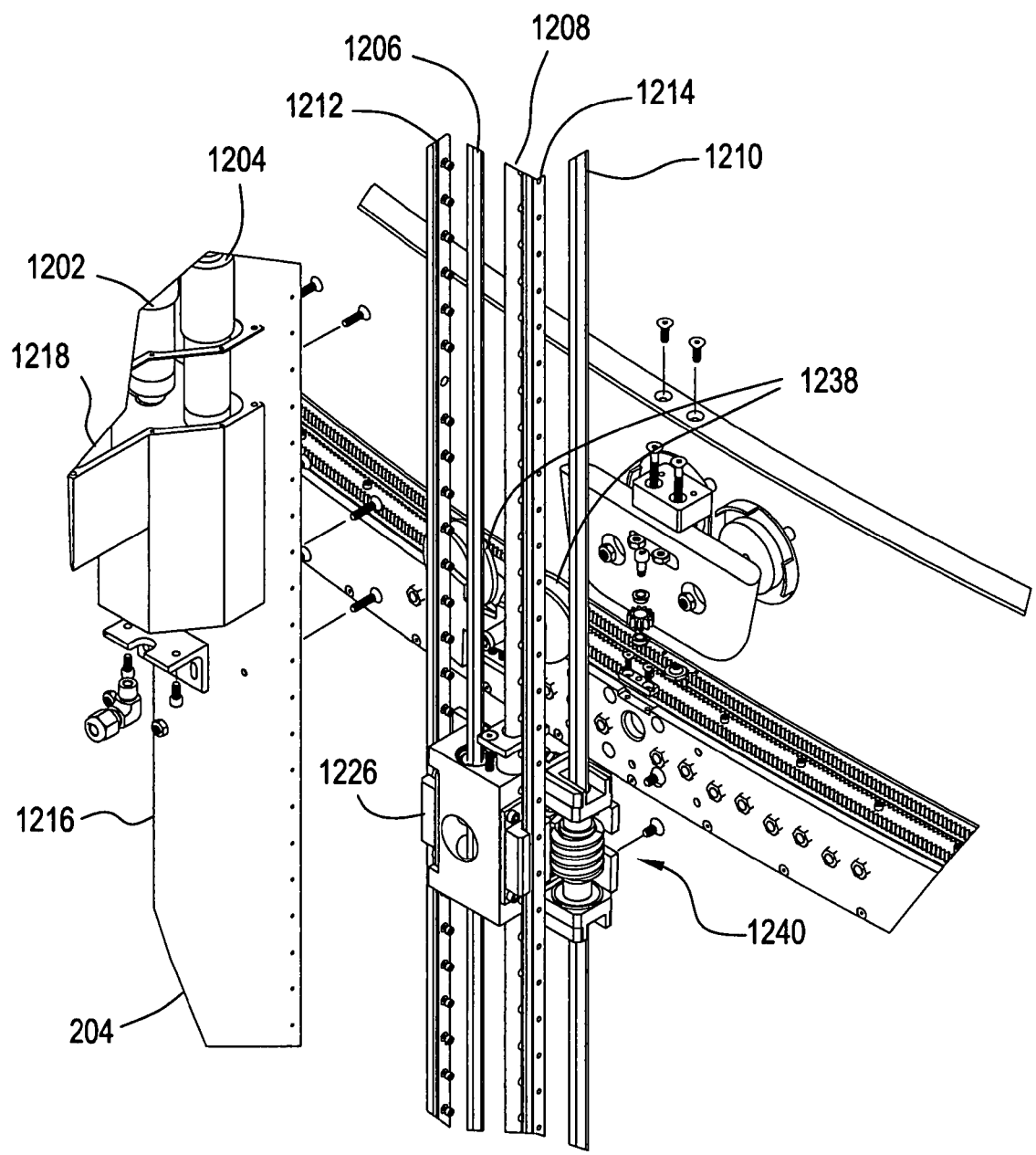
FIG. 13 is a reverse exploded, perspective view of a first portion of the first track of FIG. 11.
Figure 14:
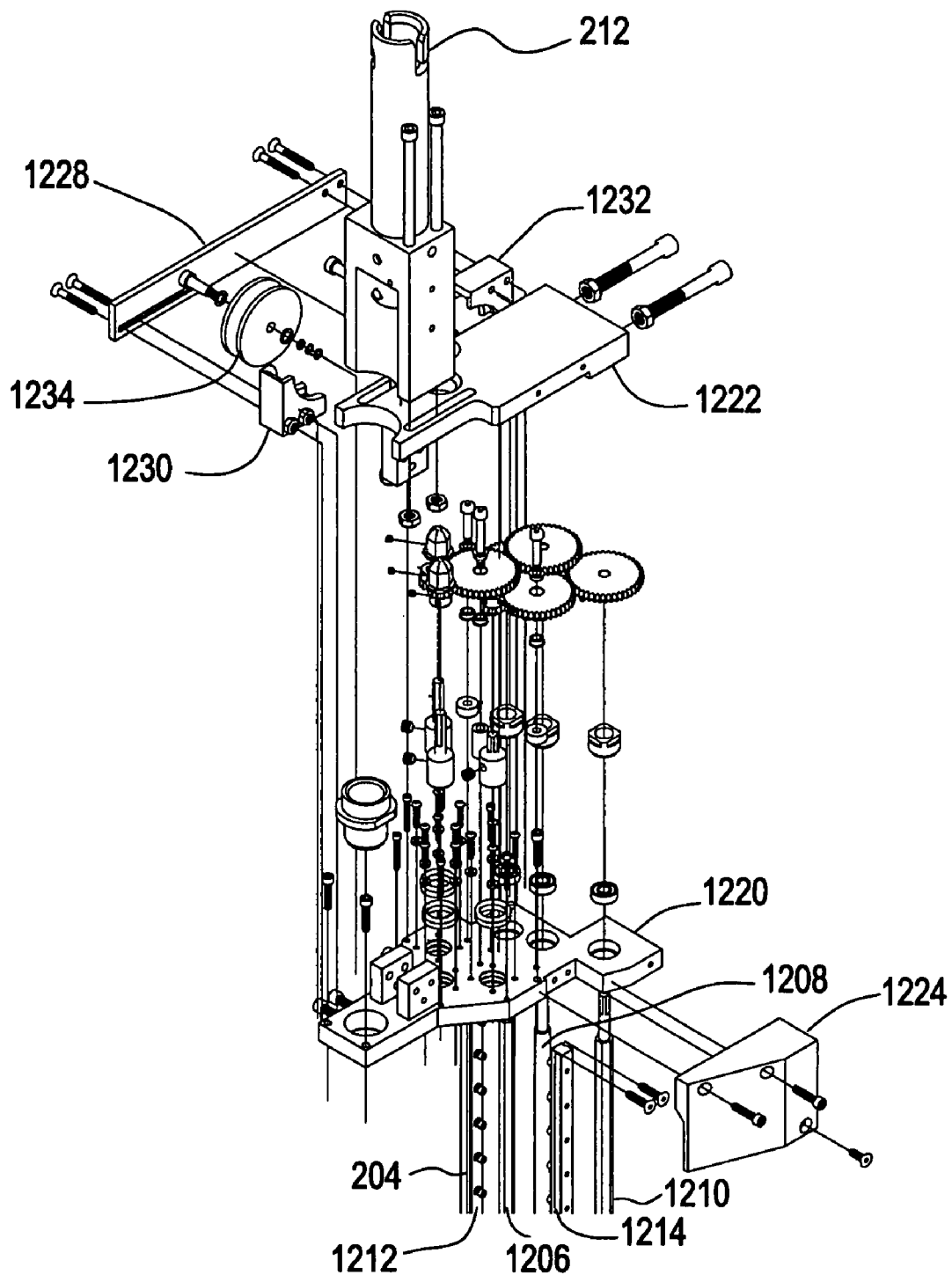
FIG. 14 is a reverse exploded, perspective view of a second portion of the first track of FIG. 11.

FIG. 11 is an exploded, perspective view of first track 204 of apparatus 200 of FIG. 2, while FIG. 12 is a reverse exploded, perspective view of first track 204 of FIG. 11, FIG. 13 is a reverse exploded, perspective view of a first portion of first track 204 of FIG. 11, and FIG. 14 is a reverse exploded, perspective view of a second portion of first track 204 of FIG. 11.

As shown in FIGS. 11-14, first track 204 may include first motor 1200, second motor 1202, and/or third motor 1204. First track 204 also may include first shaft 1206, second shaft 1208, and/or third shaft 1210. Additionally, first track 204 may include first rail 1212 and/or second rail 1214.

Other components of first track 204 may include case 1216, motor box 1218, motor box cap 1220, top support plate 1222, top support side plate 1224, rotation block assembly 1226, cable guard 1228, cable guides 1230 and 1232, pulleys 1234 and 1236, dual pulley assembly 1238; and/or gear 1240. Gear 1240, associated with rotation block assembly 1226, may be best seen in FIGS. 3 and 11.

Additionally, first track 204 may include extra components known to one of skill in the art (as shown in FIGS. 11-14), such as, for example, one or more ball bearings, brackets, cable guides, caps, drive gears, gaskets, idler gears, lock nuts, miter gears, pinions, screws, seals, shaft extensions, spacers, washers, and worm gears. In an example embodiment, first track 204 includes three gears—a pinion gear, an idler gear, and a worm gear—for each of first motor 1200, second motor 1202, and third motor 1204 (the motor turns the pinion gear, the pinion gear turns the idler gear, and the idler gear turns the worm gear).

In a first example embodiment, first track 204 may include one or more motors (i.e., first motor 1200, second motor 1202, and/or third motor 1204) adapted to move arm 202 relative to first track 204. In a second example embodiment, first track 204 may include one or more motors adapted to move arm 202 along first track 204. In a third example embodiment, first track 204 may include one or more motors adapted to move arm 202 relative to operative connection 210. In a fourth example embodiment, first track 204 may include one or more motors adapted to rotate arm 202 relative to first track 204. In a fifth example embodiment, first track 204 may include first motor 1200, second motor 1202, and third motor 1204, wherein first motor 1200 is adapted to move arm 202 relative to operative connection 210, wherein second motor 1202 is adapted to move arm 202 along first track 204, and wherein third motor 1204 is adapted to rotate arm 202 relative to first track 204.

As discussed above, first track 204 may include at least a portion of the cable management system. That portion may include, for example, one or more of cable guard 1228, cable guides 1230 and 1232, pulleys 1234 and 1236, and/or dual pulley assembly 1238, as well as some of the extra components known to one of skill in the art listed above.

In an example embodiment, the umbilical cable of the cable management system passes between cable guide 1230 and pulley 1234, then passes between cable guide 1232 and pulley 1236, then passes through first track 204 to dual pulley assembly 1238, then under guide block 304 and around one or both of guides 306 and 308, and then to effector 208, optionally contacting one or more of rollers 316, 318, and 320. In a first example embodiment, tension is maintained on the umbilical cable that passes between cable guide 1230 and pulley 1234. In a second example embodiment, the tension is kept substantially constant. In a third example embodiment, the tension is kept substantially constant using a snatch-block arrangement.

First motor 1200 and first shaft 1206 may drive arm 202 to move relative to operative connection 210. This movement may be to expand arm 202 (i.e., to unstack first section 500, second section 502, third section 504, and fourth section 506), or the movement may contract arm 202 (i.e., to stack first section 500, second section 502, third section 504, and fourth section 506). In an example embodiment, arm 202 may expand to either one side or the other of operative connection 210, providing additional flexibility in the use of apparatus 200.

As discussed above, second track 300 may include three or more sections. For example, second track 300 may include three, four, five, six, seven, eight, or more sections. The number of sections may be odd or even. The number of sections that can be used is essentially a function of the strength of the materials used to construct second track 300, first rail 1212, and second rail 1214 (first rail 1212 and second rail 1214 support substantially the entire load of expanded second track 300 to effectively prevent this load from impacting the performance of first shaft 1206, second shaft 1208, and/or third shaft 1210 and, hence, the performance of first motor 1200, second motor 1202, and/or third motor 1204).

Second motor 1202 and second shaft 1208 may drive arm 202 to move along first track 204. This "vertical" movement may be guided by first rail 1212 and/or second rail 1214.

Third motor 1204 and third shaft 1210 may drive arm 202 to rotate relative to first track 204. The drive train also may include, for example, gear 1240. The rotation may be in either a clockwise or counterclockwise sense. Thus, arm 202 may be driven in rotation to any angular position relative to first track 204. As discussed above, when inserting apparatus 200 into the reactor (and also when removing apparatus 200 from the reactor), arm 202 may be rotated to be substantially parallel to first track 204.

Arm 202 may be driven individually by first motor 1200/first shaft 1206, second motor 1202/second shaft 1208, or third motor 1204/third shaft 1210. In addition or in the alternative, arm 202 may be simultaneously driven by any combination of first motor 1200/first shaft 1206, second motor 1202/second shaft 1208, and/or third motor 1204/third shaft 1210.

Figure 15:
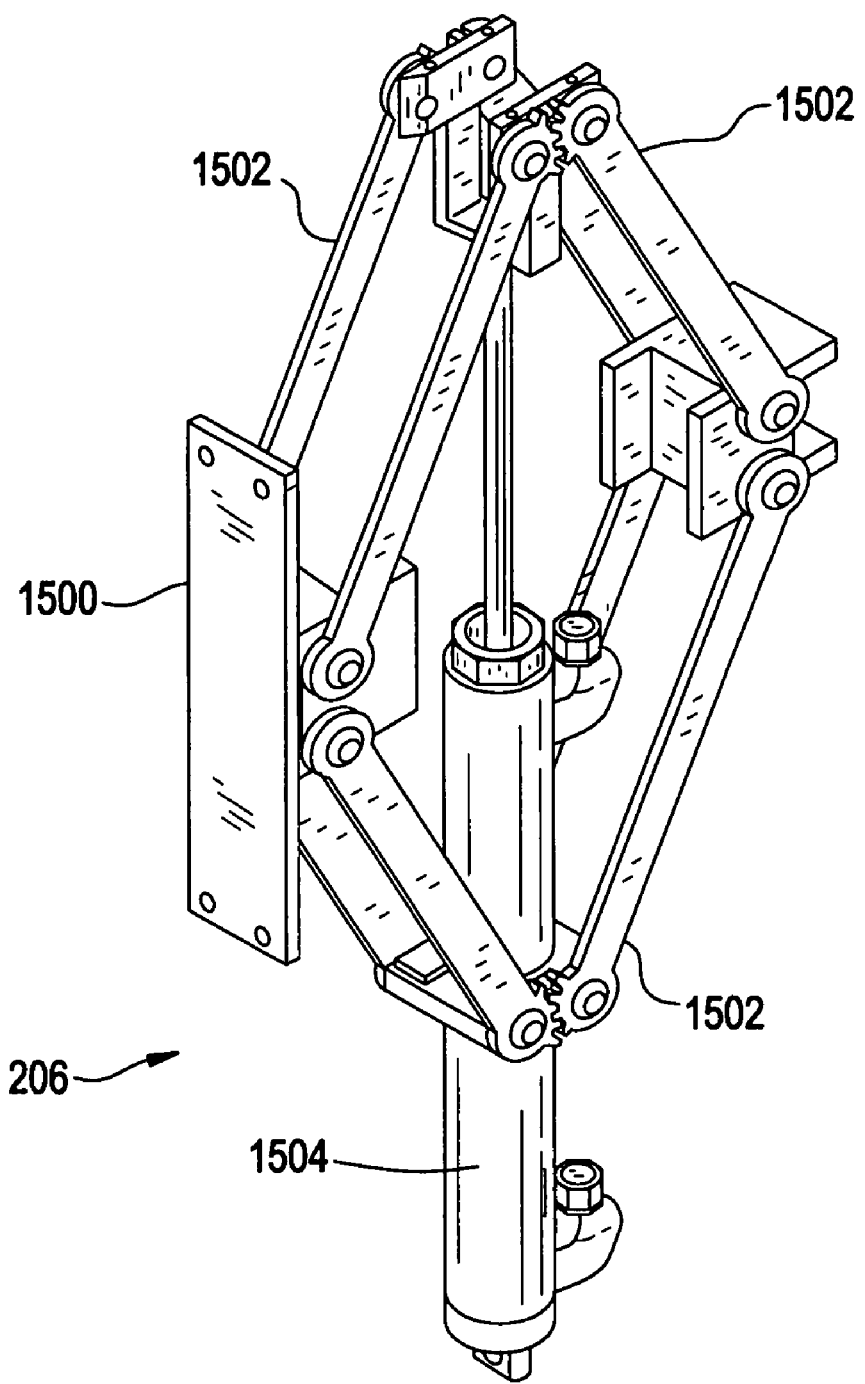
FIG. 15 is a perspective view of a fixing device of the apparatus of FIG. 2.
Figure 16:
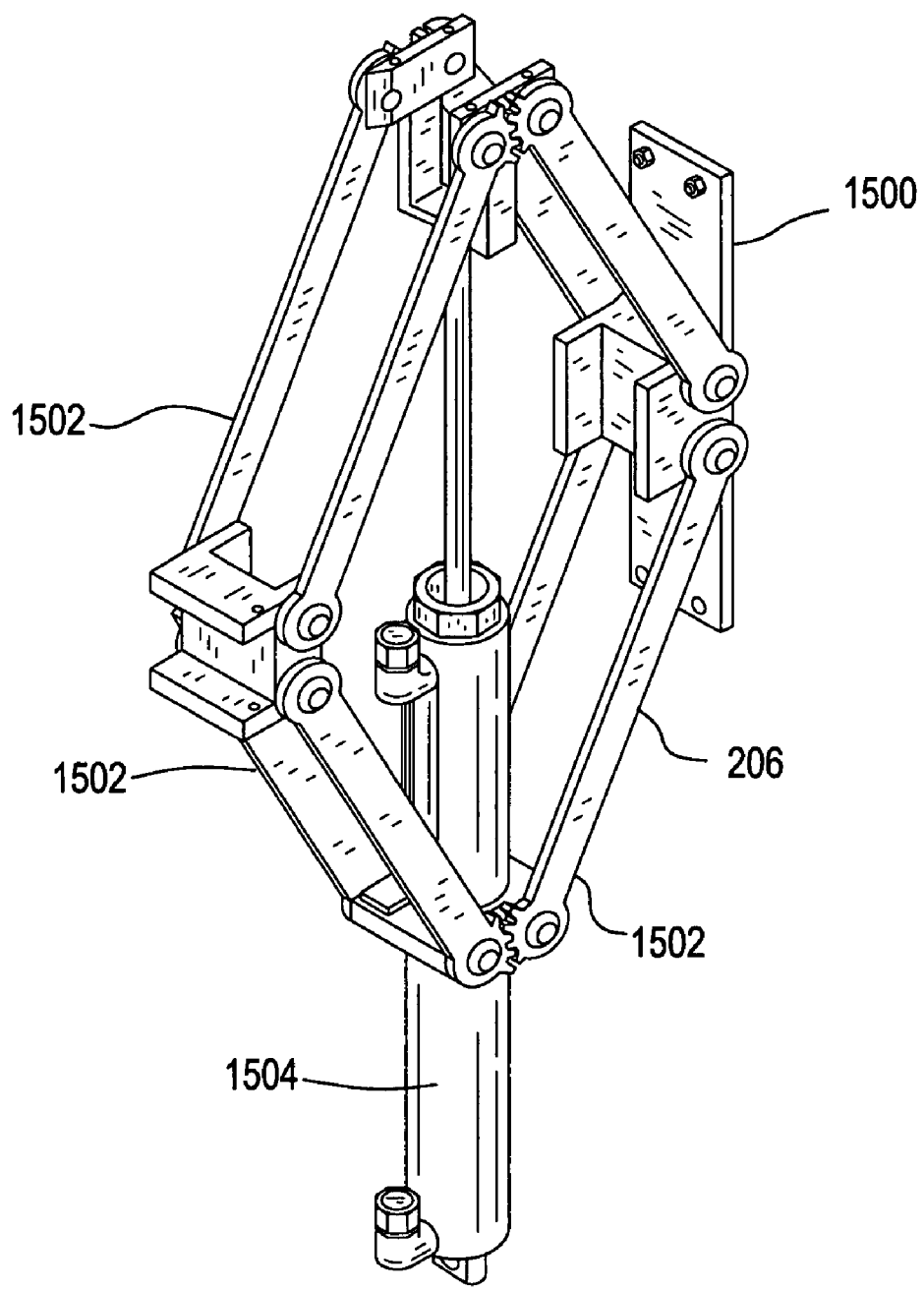
FIG. 16 is a reverse perspective view of the fixing device of FIG. 15.

FIG. 15 is a perspective view of fixing device 206 of apparatus 200 of FIG. 2, while FIG. 16 is a reverse perspective view of fixing device 206 of FIG. 15. As shown in FIGS. 15 and 16, fixing device 206 may include base 1500, plurality of legs 1502, and/or one or more pneumatic or hydraulic pistons 1504. Advantageously, the fixing device 206 of FIGS. 15 and 16 may expand from a single driven point. The one or more pneumatic or hydraulic piston 1504 may be positioned, oriented, and/or connected to base 1500 and/or plurality of legs 1502 in a variety of configurations, as is known to one of ordinary skill in the art.

In a first example embodiment, fixing device 206 may be a scissor jack. In a second example embodiment, fixing device 206 may include one or more scissor jacks. In a third example embodiment, fixing device 206 may include one or more hydraulic cylinders and/or one or more pneumatic cylinders. In a fourth example embodiment, fixing device 206 may include one or more hydraulic pistons and/or one or more pneumatic pistons. Typically, hydraulic systems in a reactor are water-based, and hydraulic and pneumatic systems must meet strict cleanliness and purity controls.

In another first example embodiment, a method of inspecting a nuclear reactor may include: operatively connecting a fixing device, a first track, an arm, and an effector to form an inspection apparatus; inserting the inspection apparatus into the reactor; fixing the inspection apparatus within the reactor; and operating the inspection apparatus.

In another second example embodiment, a method of operating a nuclear reactor may include: shutting down the nuclear reactor; inspecting the nuclear reactor, as discussed above; and starting up the nuclear reactor.

In another third example embodiment, a method of performing maintenance on a nuclear reactor may include: operatively connecting a fixing device, a first track, an arm, and one or more tools to form a maintenance apparatus; inserting the maintenance apparatus into the reactor; fixing the maintenance apparatus within the reactor; and operating the maintenance apparatus.

In another fourth example embodiment, a method of operating a nuclear reactor may include: shutting down the nuclear reactor; performing maintenance on the nuclear reactor, as discussed above; and starting up the nuclear reactor.

In another fifth example embodiment, a method of repairing a nuclear reactor may include: operatively connecting a fixing device, a first track, an arm, and one or more sensors, one or more tools, or one or more sensors and one or more tools to form a repair apparatus; inserting the repair apparatus into the reactor; fixing the repair apparatus within the reactor; and operating the repair apparatus.

In another sixth example embodiment, a method of operating a nuclear reactor may include: shutting down the nuclear reactor; repairing the nuclear reactor, as discussed above; and starting up the nuclear reactor.

In each of these six example embodiments, the arm may have a contracted length and an expanded length, and the expanded length may be greater than two times the contracted length.

While example embodiments have been particularly shown and described, it will be understood by those of ordinary skill in the art that various changes in form and details may be made in the example embodiments without departing from the spirit and scope of the present invention as defined by the following claims.

What is claimed is:

1. An apparatus for inspecting a nuclear reactor, the apparatus comprising:
   a first track;
   an arm including one or more second tracks;
   a fixing device; and
   an effector;
   wherein the arm is operatively connected to the first track,
   wherein at least one of the one or more second tracks includes at least three track sections,
   wherein the fixing device is operatively connected to the first track,
   wherein the effector is operatively connected to the arm,
   wherein the arm has a contracted length,
   wherein the arm has an expanded length, and
   wherein the expanded length is greater than two times the contracted length.

2. The apparatus of claim 1, wherein the first track comprises one or more motors adapted to move the arm relative to the first track.

3. The apparatus of claim 1, wherein the first track comprises one or more motors adapted to move the arm along the first track.

4. The apparatus of claim 1, wherein the first track comprises one or more motors adapted to move the arm relative to the operative connection of the arm to the first track.

5. The apparatus of claim 1, wherein the first track comprises one or more motors adapted to rotate the arm relative to the first track.

6. The apparatus of claim 1, wherein the first track comprises first, second, and third motors,
   wherein the first motor is adapted to move the arm relative to the operative connection of the arm to the first track,
   wherein the second motor is adapted to move the arm along the first track, and
   wherein the third motor is adapted to rotate the arm relative to the first track.

7. The apparatus of claim 1, further comprising:
   a cable management system.

8. The apparatus of claim 7, wherein the first track comprises at least a portion of the cable management system.

9. The apparatus of claim 7, wherein the arm comprises at least a portion of the cable management system.

10. The apparatus of claim 1, wherein the arm is adapted to move relative to the first track.

11. The apparatus of claim 1, wherein the arm is adapted to move along the first track.

12. The apparatus of claim 1, wherein the arm is adapted to move relative to the operative connection of the arm to the first track.

13. The apparatus of claim 1, wherein the arm is adapted to rotate relative to the first track.

14. The apparatus of claim 1, wherein at least one of the one or more second tracks is a curved track.

15. The apparatus of claim 1, wherein at least one of the one or more second tracks is a substantially straight track.

16. The apparatus of claim 1, wherein the at least three sections are adapted to contract the arm to the contracted length,
 wherein the at least three sections are adapted to expand the arm to the expanded length, or
 wherein the at least three sections are adapted to contract the arm to the contracted length and the at least three sections are adapted to expand the arm to the expanded length.

17. The apparatus of claim 1, wherein the fixing device comprises one or more scissor jacks.

18. The apparatus of claim 1, wherein the fixing device comprises one or more hydraulic cylinders, one or more pneumatic cylinders, or one or more hydraulic cylinders and one or more pneumatic cylinders.

19. The apparatus of claim 1, wherein the fixing device comprises one or more hydraulic pistons, one or more pneumatic pistons, or one or more hydraulic pistons and one or more pneumatic pistons.

20. The apparatus of claim 1, wherein the operative connection of the effector to the arm comprises a bracket.

21. The apparatus of claim 20, wherein the bracket is spring-loaded.

22. The apparatus of claim 1, wherein the operative connection of the effector to the arm comprises a gimbal.

23. The apparatus of claim 1, wherein the effector comprises one or more sensors.

24. The apparatus of claim 23, wherein the one or more sensors comprise at least one camera.

25. The apparatus of claim 23, wherein the one or more sensors comprise at least one video camera.

26. The apparatus of claim 23, wherein the one or more sensors comprise at least one transducer.

27. The apparatus of claim 23, wherein the one or more sensors comprise at least one ultrasonic transducer.

28. An apparatus for inspecting a nuclear reactor, the apparatus comprising:
 a first track;
 an arm including one or more second tracks;
 a fixing device; and
 an effector;
 wherein the arm is operatively connected to the first track,
 wherein at least one of the one or more second tracks includes at least three track sections,
 wherein the fixing device is operatively connected to the first track,
 wherein the effector is operatively connected to the arm, and
 wherein the first track includes one or more motors adapted to move the arm relative to the first track.

29. The apparatus of claim 28, wherein the first track comprises one or more motors adapted to move the arm along the first track.

30. The apparatus of claim 28, wherein the first track comprises one or more motors adapted to move the arm relative to the operative connection of the arm to the first track.

31. The apparatus of claim 28, wherein the first track comprises one or more motors adapted to rotate the arm relative to the first track.

32. The apparatus of claim 28, wherein the first track comprises first, second, and third motors,
 wherein the first motor is adapted to move the arm relative to the operative connection of the arm to the first track,
 wherein the second motor is adapted to move the arm along the first track, and
 wherein the third motor is adapted to rotate the arm relative to the first track.

33. An apparatus for performing maintenance on or repairing a nuclear reactor, the apparatus comprising:
 a first track;
 an arm including one or more second tracks;
 a fixing device;
 one or more sensors; and
 one or more tools;
 wherein the arm is operatively connected to the first track,
 wherein at least one of the one or more second tracks includes at least three track sections,
 wherein the fixing device is operatively connected to the first track,
 wherein the one or more sensors, the one or more tools, or the one or more sensors and the one or more tools are operatively connected to the arm,
 wherein the arm has a contracted length,
 wherein the arm has an expanded length, and
 wherein the expanded length is greater than two times the contracted length.

34. An apparatus for performing maintenance on or repairing a nuclear reactor, the apparatus comprising:
 a first track;
 an arm including one or more second tracks;
 a fixing device;
 one or more sensors; and
 one or more tools;
 wherein the arm is operatively connected to the first track,
 wherein at least one of the one or more second tracks includes at least three track sections,
 wherein the fixing device is operatively connected to the first track,
 wherein the one or more sensors, the one or more tools, or the one or more sensors and the one or more tools are operatively connected to the arm, and
 wherein the first track includes one or more motors adapted to move the arm relative to the first track.

35. The apparatus of claim 28, wherein the arm is adapted to move relative to the first track.

36. The apparatus of claim 28, wherein the at least three sections are adapted to contract the arm to the contracted length,
 wherein the at least three sections are adapted to expand the arm to the expanded length, or
 wherein the at least three sections are adapted to contract the arm to the contracted length and the at least three sections are adapted to expand the arm to the expanded length.

* * * * *